United States Patent [19]

Olson et al.

[11] 3,836,078
[45] Sept. 17, 1974

[54] MONITORING SYSTEM FOR MOBILE IRRIGATION APPARATUS

[75] Inventors: Rich L. Olson; Murray C. Roland, both of Scottsbluff; Clif Hammond, Gering, all of Nebr.

[73] Assignee: Lockwood Corporation, Gering, Nebr.

[22] Filed: June 9, 1972

[21] Appl. No.: 261,422

[52] U.S. Cl. ............ 239/70, 239/71, 239/177, 239/212
[51] Int. Cl. .............................................. A01g 27/00
[58] Field of Search ........ 239/67, 70, 71, 212, 177; 340/252 R, 253 R

[56] References Cited
UNITED STATES PATENTS
2,960,657  11/1960  Edgerly ..................... 340/252 R X Primary Examiner—M. Henson Wood, Jr.
Assistant Examiner—John J. Love

[57] ABSTRACT

A control system for mobile irrigation apparatus which includes a pivot tower and a plurality of radially spaced motor driven mobile towers supporting a distribution pipe includes means for determining the direction of movement of the system, the amount of water to be supplied to the crop and monitoring means in the form of lights connected in the control system to provide an operator with an immediate means of determining whether the system is operating and has been operating properly and also aids in identifying the sources of particular malfunctions.

8 Claims, 4 Drawing Figures

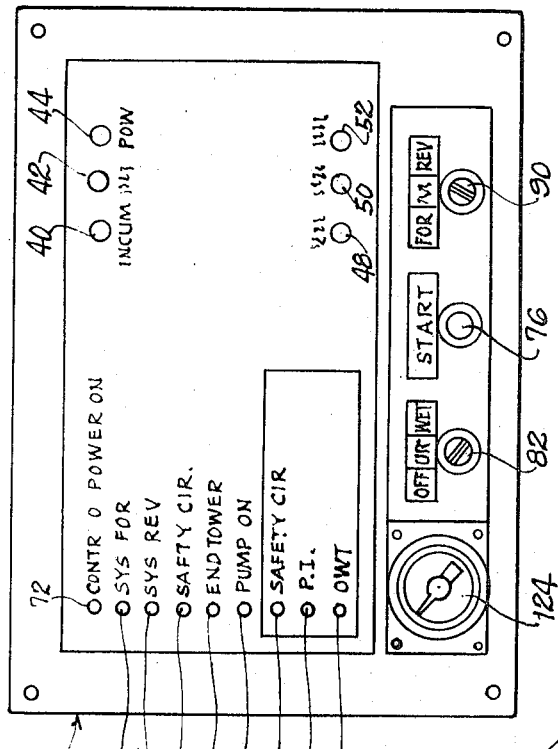
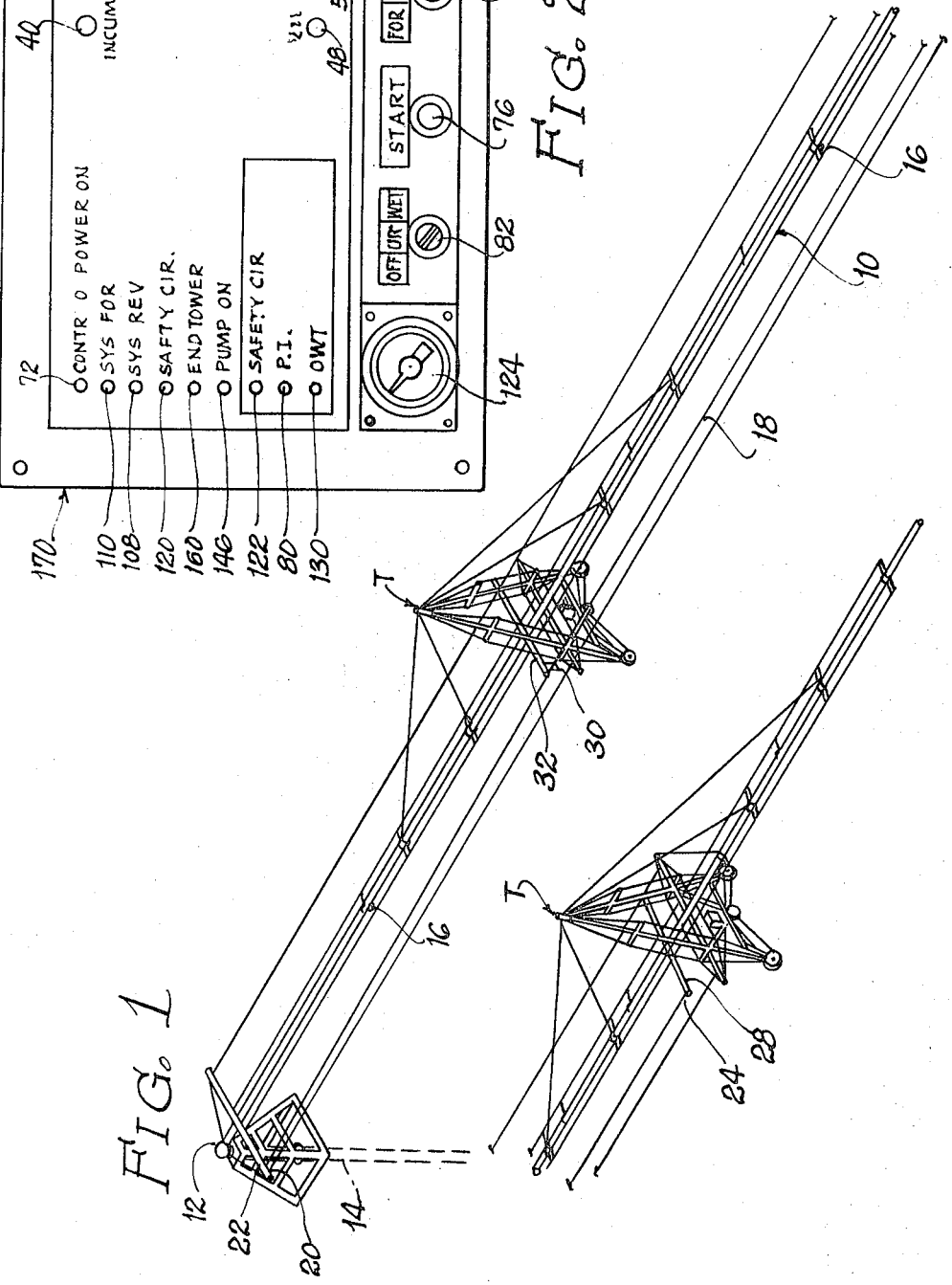
FIG. 2
FIG. 1

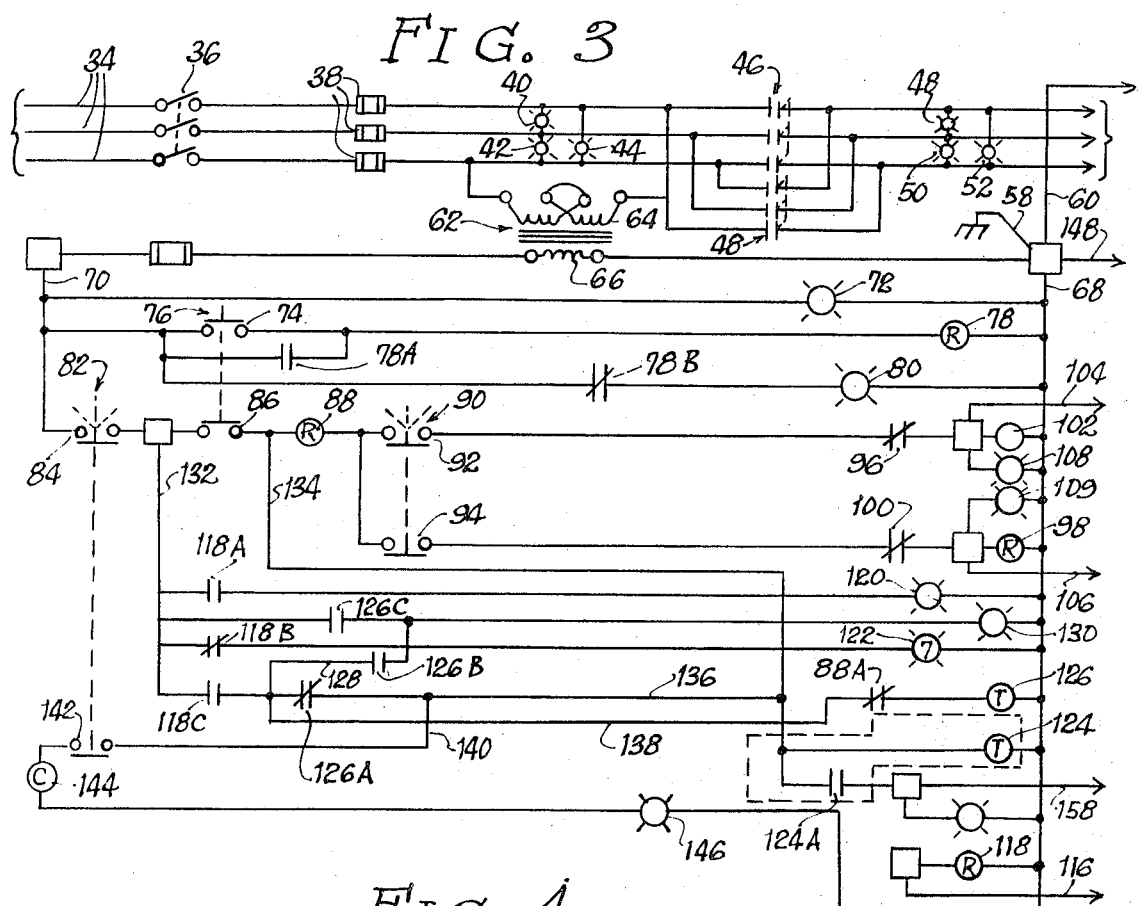

3,836,078

MONITORING SYSTEM FOR MOBILE IRRIGATION APPARATUS

BACKGROUND OF THE INVENTION

This invention relates generally to control systems for mobile irrigation apparatus. More specifically, it relates to such control systems including means for monitoring the performance of the apparatus.

Mobile irrigation systems utilizing a distribution pipe, one end of which is supported on a central pivot tower and the length of which is supported on self-propelled moving towers so that over a period of time the distribution pipe moves in a circular path over a field, are well known. In the operation of such systems, it has been found important to provide the operator with means for readily ascertaining the performance of the system. There are several reasons for this. One is that once set into operation such apparatus is usually left untended. Therefore, the operator upon activating the system and before leaving it is desirous of knowing that the system is functioning properly. Another is that during the untended or unobserved periods of operation it is important for the operator to know, upon inspecting the system, that is has been performing properly during the untended period. In addition, realistically, irrigation apparatus of this type is probably not going to be inspected and maintained as it should be and therefore it is advantageous to provide means to aid in identifying or locating elements of the apparatus which may not be in working condition and to provide an indication of that situation so that the user does not put the system into operation when some element thereof may not be effective to operate.

Therefore, it is an object of this invention to provide a control system for mobile irrigation apparatus which includes means for monitoring the apparatus and providing an indication of its performance.

It is another object of this invention to provide a means for monitoring the performance of a mobile irrigation system in which any malfunction of the monitoring system cannot in and of itself affect the operation of the apparatus.

SUMMARY OF THE INVENTION

The foregoing and other objects are achieved in an embodiment of the invention which comprises a control system including strategically connecting monitoring means to provide an indication of the operation and possible malfunctions in a mobile irrigation apparatus.

BRIEF DESCRIPTION OF THE DRAWINGS

The invention itself is set forth in the claims appended hereto and forming a part of this specification while an understanding of an embodiment thereof may be derived from the detailed description taken in conjunction with the drawings in which:

FIG. 1 is a perspective view of a mobile irrigation system embodying the invention, showing the pivot end and the outer end section with the interventing portions omitted;

FIG. 2 is a front view of a control panel forming a part of the invention;

FIG. 3 is a schematic diagram of a portion of the electrical circuit including that of the control panel forming a part of the invention; and FIG. 4 is a schematic diagram of the remainder of the electrical circuit forming a part of the invention.

DETAILED DESCRIPTION

FIG. 1 illustrates a mobile irrigation system wherein a distribution pipe extends from a central pivot. However, it should be understood that the system illustrated is for purposes of exemplification only for it is contemplated that any irrigation system deriving water from a pumped well may be improved in accordance with the invention.

Referring now to the drawings for a description of the invention, the numeral 10 indicates the elongate horizontally disposed water distribution pipe which is provided with a swivel connection 12 at its inner end for pivotal attachment to the upper end of a feed pipe which may extend downwardly to a well in the ground or which is otherwise supplied with water under pressure for irrigation, as from a stream, well or other source of water. Thus, the feed pipe 14 represents the axis about which the water distributor pipe turns. Other means for pivotal attachment in sealing engagement between the distributor pipe and the feed pipe are well known by reason of the widespread utilization of such an arrangement in commercial practice.

The distributor pipe 10 is provided with a plurality of spray nozzles 16 at frequently spaced intervals along the length of the pipe for operation as overhead sprays to sprinkle water onto the crop as the distributor pipe moves about the feed as its axis. The distributor pipe is supplied with water under pressure, as by means of a water pump connected with a supply pipe or water tower.

A number of mobile towers T are arranged in longitudinally spaced apart relation along the length of the distributor pipe with means for engaging the adjacent portions of the pipe for support. The number of mobile towers T can be varied depending somewhat upon the spaced relationship between supports and the length of the distributor pipe. The distributor pipe 10 can be suspended from the support by means of a cable so as to be carried by the support.

To maintain automatic alignment of the towers a flexible cable 18 which is fixed at its inner end 20 to an arm 22 which extends laterally from the pivot while the outer end 24 is fixed to the end portion of a laterally extending cross beam 28 on the outermost tower so that the flexible cable 18 will extend in essentially a straight line from said pivot to said outermost tower.

The flexible cable is threaded through an opening in a pendulum 30 that is mounted on each of the intermediate towers for free rocking movement about an axis which is parallel with the axis of the pipe and in a direction crosswise of the distributor pipe. The pendulum 30 comprises an elongate member which is suspended to depend from the tower on a pivot pin extending laterally from the end portion of a horizontally disposed cross brace member 32 rigid with the tower.

When the intermediate mobile tower is in proper alignment, the pendulum will be suspended from its pivot to hang downwardly substantially perpendicularly so that the pendulum will be free of the plunger of a swtich controlling the tower drive motors.

Referring now to FIGS. 3 and 4 of the drawing, the main power circuit and a control system and monitoring system in accordance with the invention may be seen. Incoming power is supplied via lines 34 adapted to be connected by suitable terminal means to a three-phase power source. The entire system may be connected or disconnected from the source by means of a manually-operated power disconnect 36. Suitable protection in the form of fuses 38 may be provided.

In accordance with the invention, a plurality of monitor lights 40, 42 and 44 may be connected across the lines 34 as shown so as to be lit when the power disconnect is closed indicating to the operator that power is available to the apparatus. The terminals 46 of a first or forward contactor are connected in series with the lines 34 and which when closed will permit operation of the tower drive motors in the forward direction. The terminals of a second contactor or reverse 48 are connected to reverse the phase sequence of the power supplied to the tower motors when it is desired to operate them in the reverse direction. The coils of the contactors 46 and 48 are connected in the control circuit as will be described subsequently.

In further accordance with the invention, monitor lights 48, 50 and 52 are connected across the lines 34 as shown so as to be energized when the disconnect 36 and either one of the sets of contactor terminals 46 or 48 is closed so as to provide an indication to the user that power is available on the tower motor side of the contactor terminals.

Referring to FIG. 4, the lines 34 are connected to the terminals 54 of a contactor, mounted on a control panel on each tower, which in turn are connected to the drive motors 56 of each tower. To insure the electrical safety of the system a ground connection 58 may be provided which is connected by a bus 60 to the boxes or housings for the tower controls.

Electrical energy for operating the pivot tower control and each mobile tower control is provided by means of a transformer 62 having a primary winding 64 connected across the lines 34. The transformer 62 has a secondary winding 66 and the turns ratio is such as to provide for a voltage reduction on the secondary. The secondary winding 66 is connected between a bus 68 connected to the ground 58 and a bus 70 so as to provide for supply voltage between buses 68 and 70. In order to provide, as an aspect of the invention, an indication that the system is ready to run and control power is being supplied, a lamp 72 is connected between the buses 68 and 70. Thus, the lamp 72 will be lit when the disconnect 36 is closed unless a fuse 38 has blown. In addition, if other circuit protective elements such as further fusing are provided ahead of the connections of the lamp 72, that lamp will not light and will therefore provide an indication of that condition.

As pointed out above and as will be brought out, the monitoring connections and elements are connected in such a way so as to be independent of the control circuit whereby any failure of a monitoring element would not result in inadvertent or improper operation of the irrigation apparatus. Thus, the control circuit includes the normally opened contacts 74 of a start switch 76 connecte in series with the operating coil of a relay 78 between the buses 70 and 68. Included in the relay 78 are first normally open contacts 78A and second normally closed contacts 78B. The contacts 78A shunt the contacts 74 of the start switch 76 while the normally closed contacts 78B are connected on the bus 70 side of the contacts 74 in series with a lamp 80 connected to the bus 68. Consequently, when the start switch is operated to close the contacts 74, the relay coil 78 is operated closing the contacts 78A and opening the contacts 78B. The closure of the contacts 78A provides a holding circuit around the contacts 74 while the opening of the contacts 78B deenergizes the lamp 80 if it had been previously energized. As a result of the arrangement shown, the lamp 80 is effective to indicate to the operator that during an untended period there had been a power interruption. As may be seen, when the power disconnect 36 is closed and before the start switch 76 is operated to close contacts 74, a circuit is complete for the lamp 80 so that that lamp would therefore be lit upon closure of the disconnect. If a power interruption longer than the time required for relay 78 to operate occurs, the relay 78 would drop out closing the contacts 78B. Thus, if there is a power interruption with power disconnect 36 closed, that is to say, during a period of untended operation, when power is restored the lamp 80 will be lit and provide an indication that such has occurred.

The forward and reverse contactors 46 and 48, respectively, are initially operated by a circuit including a three-positioned switch 82 operating a pair of contacts 84. The contacts 84 are connected in series with normally opened contacts 86, one terminal of which is connected to the operating coil of a current sensing relay 88. The relay 88 operates a pair of normally closed contacts 88A connected, as will be described subsequently. Further connected in series with the relay coil 88 is a two-positioned switch 90 which includes contacts 92 and 94. The contacts 92 are connected in the normally closed contacts 96 operated by the coil of a contactor 98 which, when energized, closes the contacts 46 to provide for forward movement of the mobile towers. The contacts 94 are connected to the normally closed contacts 100 operated by the coil of a reversing contactor 102 which when energized closes the contacts 48 so as to provide for reverse movement of the mobile towers. A conductor 104 is connected between the contacts 96 and contactor 102 so as to provide a control signal to the individual tower control panels as will be explained in conjunction with FIG. 4. A similar conductor 106 is connected between the terminals 100 and contactor coil 98 to provide a similar control signal for forward operation of the mobile towers. Means for monitoring the operation of the forward and reverse circuits are constituted by a lamp 108 shunting the contactor 102 and a lamp 109 shunting the contactor 98.

Extending the length of the apparatus is an additional safety means constituted by a bare wire 110 (see FIG. 4) which runs parallel to the flexible cable 18. A transformer 112 is connected to energize the wire 110 with a low voltage and a relatively low current through a current limiting resistor 114. The wire 110 is held by insulators 111 along the length of the distribution system. In the event of misalignment of the apparatus, the bare wire 110 will be grounded and will be thereby shortened out. Barring such a situation the low voltage supplied via the wire 110 is connected to the ground bus 68 so as to provide a circuit normally energizing that relay during operation of the apparatus. The relay 118 is provided with a normally opened contact 118A, a normally closed contact 118B and another normally opened contact 118C. The normally opened contact 118A controls a lamp 120 connected between it and the ground bus 68. Thus, in normal operation of the device the relay 118 is picked up and the contact 118A therefore closed and the lamp 120 lit. In the event of misalignment, as detected by the safety circuit constituted by the wire 110 and the grounding or shorting of that wire by virtue of a contact with any metal structure forming a part of the towers or distribution pie support means, the relay 118 will drop out opening the contact 118A so as to deenergize the lamp 120.

The normally closed contact 118B of relay 118 is connected to a lamp 122 which in turn is connected to the negative bus 68. As may be seen, when the contacts 84 of the switch 82 are closed, a circuit is completed for the lamp 7 through the normally closed contacts 118B. When the system is put into operation by closing contacts 84 and disconnect 36, the lamp 122 will be lit. After the start button 76 is depressed to start the tower motors if the system is in proper alignment the relay 118 will pick up, because the wire 110 is now energized, and open contacts 118B and the lamp 122 will go out. If the system is misaligned, the bare wire 110 will be shorted out, the relay 118 will not pick up and lamp 122 will remain lit to provide an indication to the operator of that condition so that he may inspect the system to identify the trouble.

Included in the control circuit is a timer effective to control the rate at which water is applied to the crop being irrigated. This provides a means whereby the amount of water delivered can be related to the rate of travel of the irrigation apparatus. This timer which may be termed a percentage timer is designated by reference character 124 and is connected between the buses 70 and 68 so as to begin cycling when contacts 84 and 86 are closed. The timer itself is of the type known in the art which will cycle or close its contacts for predetermined time intervals and may therefore be adjusted to fix a predetermined time at which the contacts controlled thereby are in a desired state. Contact 124A is operated by the timer 124 so as to be closed periodically and maintained closed for a desired time interval. For instance, if timer 124 has a 30 second operating cycle, the control knob of that time may be adjusted to a determined percentage of that cycle at which time the contacts 124A will be closed.

In order to control the running speed of the system and therefore the watering rate, assuming a constant water flow into the distribution pipe 10, the timer 124 operates in conjunction with control apparatus disclosed and claimed in the copending U.S. Pat. application of Max H. Ririe et al. for "Alignment Means For Mobile Irrigation Apparatus" filed on March 31, 1971, Ser. No. 129,793, and assigned to the same assignee as is this application.

Before explaining the operation of the control system, the description of its various elements will be completed. Thus, an additonal monitored protection means is provided by a timer 126 which is effective to provide an indication when the system has stopped moving and watered one place in excess of a predetermined amount of time, for instance, 10 minutes. The timer 126 is connected from the the bus 68 through the normally closed contacts 88A of the current sensing, its own normally closed contacts 126A, relay 88 and the normally open contacts 118C of the relay 118 to one terminal of the contacts 84 of the switch 82. In addition to the contacts 126A, the timer 126 operates normally open contacts 126B and 126C. The contact 126B is connected in conductor 128 extending from the junction of contacts 118C and 126A to the junction of contacts 126C and a lamp 130.

The circuit at the pivot tower control panel includes a conductor 132 connected to a terminal of contacts 84 and terminals of contacts 118A, 126C, 118B and 118C. Another conductor 134 is connected from the junction of contacts 86 and relay 88 to timer 124 while still another conductor 136 is connected from contacts 126A to that timer. A conductor 138 connects the junction of the contacts 118C and 126A to the contacts 88A and thus to the timer 126. This pivot tower circuit is completed by connection 140 through contacts 142 of switch 82, a contactor coil 144 and a lamp 146 to the neutral bus 68.

Each intermediate tower control includes the elements previously described in addition to the following elements. A neutral conductor 148 is connected from the ground 58 to one terminal of the contactor coil on each tower so that a circuit for each coil may be completed via either conductor 104 or 106, depending on whether contactor coil 102 or 98 is energized and a contact 150 or 152 of a switch 154 operated by a pendulum 30 forming a part of the alignment system described briefly in this application and completely in the copending application of Max H. Ririe et al. referred to above.

The end tower control includes a connection by the neutral conductor 148 to one side of its contactor coil and a connection 156 from the other side of that coil to the contacts 124A of timer 124 and through a lamp 158 to the bus 68.

The operation of the control and monitoring system is as follows. Assume that forward, wet operation with a 50 percent setting of the timer 124 is desired. The timer 124 is set accordingly and switch 90 is operated to close contacts 94 while switch 82 is operated to close contacts 84 and 142. When disconnect 36 is closed, if power is available on the line, lamps 40, 42 and 44 will be lit and if control power is available at the control, panel lamp 72 will be lit. At the same time lamp 80 will be lit through normally closed contacts 78B.

The start switch 76 is depressed momentarily closing its contacts 74 and 86. This causes relay 78 to pick up locking itself in through contacts 78A. At the same time, lamp 80 will go out as the contacts 78B are opened. Closure of contacts 86 completes a circuit from bus 70, now closed contacts 84, contacts 86, relay 88, now closed contacts 94, contacts 100 and forward contactor coil 98. With the energization coil 98, the contacts 46 are closed as will be shown by the lighting of lamps 48, 50 and 52. At the same time contact 96 is opened to insure against accidental operation of the reverse contactor.

If it is further assumed that at the time contacts 86 are closed the contacts 124A are closed, a circuit is completed via the conductor 134, contacts 124A, conductor 158 to the contactor coil in the end tower and from that coil via conductor 148 to ground. Thus, that contactor will close causing its motor to operate in the forward direction. As the end tower starts to move, the pendulum 30 on any one or more of the intermediate towers will be effective to operate its associated switch 152 to close contact 150. This will complete a circuit for its associated contactor through contacts 84 and 86, relay coil 88, contacts 94 and 100, and conductor 106 causing that contact to close and operate its associated motor 56.

If the system is not misaligned, and its operation to be permitted to continue, wire 110 will be energized and provide voltage via conductor 116 to pick up relay 118. Relay 118 picking up closes its contacts 118A to light lamp 120. Contacts 118B open deenergizing lamp 122. If lamp 122 does not go out after start switch 76 is closed the operator is provided with an indication that the system is misaligned and should be inspected. Continuing, and assuming alignment, contacts 118C close to complete a circuit from now closed contacts 84, conductor 132, contacts 118C, contacts 126A, conductor 136 and conductor 134 to relay 88 maintaining that relay picked up and power to the forward contactor coil 98.

The closure of contacts 118C also permits a circuit to be completed via conductor 140, now closed contacts 142, pump motor contactor coil 144 and lamp 146 to the bus 68. Thus; the pump motor is started and a lamp is lit to provide an indication that the pump circuit is energized.

The sequence just described occurs during the period the start switch is momentarily depressed. As can be seen when that switch is released opening its contacts 74 and 86 circuits are still maintained for the light 80 and the contactor coil 98.

The system will continue to operate as follows. Assuming the timer 124 has a 30 second cycle and has been set for 50 percent, the contact 124A will be open for 15 seconds and closed for 15 seconds. Accordingly, the motor on the end tower and a light 160 will be energized for like periods and the speed of the system (and therefore its watering rate) will be determined. As the end tower advances, the motors in the intermediate towers will cycle on and off as determined by the action of the alignment cable and their pendulum operated switches 154 to maintain alignment of the entire system.

As long as the system operates properly, the relay 118 stays picked up keeping its 118C contact closed. If a sever misalignment should occur for any reason and wire 110 shorts out, relay 118 drops out causing lamp 120 to go out by opening contacts 118A, lights lamp 122 by closing contacts 118B and opens contacts 118C. Contacts 118C opening remove power from the circuit for the tower and pump motor contactors so that those motors are stopped to protect the system. The opening 118C also interrupts power to the timer 124 causing it to stop cycling.

When the relay 88 was picked up its contact 88A was opened so that the timer 126 could not begin to cycle. However, if the system should stop moving, for instance, because the end tower has stopped, the current through relay 88 will drop causing it to drop out and close contacts 88A. This means the system has stopped but is continuing to water the crop. If excess water is applied there may be damage to the crop so the closure of contacts 88A starts the timer 126 and after a predetermined interval, for instance 10 minutes, its contacts 126A, B and C are operated. Contact 126C closes lighting lamp 130 to provide an indication of this condition. Contact 126A opens to interrupt the pump motor circuit. The contacts 126B when closd and conductor 128 provide a circuit around contacts 118C for the timer 126 to maintain that timer in operated position with the contacts 126A open and the lamp 130 lit.

The system thus provides a means for monitoring every important aspect of the operation of a mobile irrigation system: incoming power, system power, control power, forward or reverse running, alignment, end tower control power, the pump circuit, misalignment, power interruption and overwatering. All of these monitoring in the form of lights may be labeled and arranged for easy viewing on a control panel 170 (see FIG. 2) along with the operating elements of the timer 124 and switches 82, 76 and 90.

Various modifications can be made in the invention without departing from the spirit thereof and it is intended by the claims to cover all modifications and changes from the embodiment disclosed, as come within their scope.

What is claimed as new and desired to be secured by Letters Patent is:

1. A monitoring system for mobile irrigation apparatus including: a central pivot tower, a plurality of intermediate towers, an end tower, a distribution pipe having one end pivotally mounted on the pivot tower and supported along its length by said intermediate and end towers, sprinkler units spaced along the distribution pipe, drive motors on the intermediate and end towers, water pumping means connected to the distribution pipe, means supplying electrical power to the apparatus, means for controlling the water pumping means, means for controlling the drive motors on the intermediate towers, means for controlling the drive motor on the end tower, and means for controlling the watering rate of the apparatus; the said monitoring system comprising a plurality of lamps, a number of said lamps being individually connected to different ones of said controlling means to provide an indication of the condition of said controlling means, means for supplying controlling electrical power to all said controlling means, a lamp connected to the controlling electrical power supply means for indicating that controlling electrical power is being supplied, a relay connected to said last mentioned lamp, said relay connected to said means for supplying controlling power to all said control means, a switch including contacts connected to said relay and effective upon operation to ennergize said relay, and said relay contacts upon energization of said relay interrupting a circuit to said last mentioned lamp and upon deenergizing completing a circuit to said lamp.

2. A monitoring system for mobile irrigation apparatus including: a central pivot tower, a plurality of intermediate towers, an end tower, a distribution pipe having one end pivotally mounted on the pivot tower and supported along its length by its intermediate and end towers, sprinkler units spaced along the distribution pipe, drive motors on the intermediate and end towers, water pumping means connected to the distribution pipe, means supplying electrical power to the apparatus including a plurality of electrical conductors, means for controlling a water pump means, means for controlling the drive motors on the intermediate towers, means for controlling the drive motor on the end tower, and means for controlling the watering rate of the apparatus; said monitoring system comprising a plurality of lamps, a number of said lamps being individually connected to different ones of said controlling means to provide an indication of the condition of said controlling means, and a plurality of lamps each individually connected between a pair of conductors so as to be energized when current is flowing in said conductors.

3. A monitoring system as set forth in claim 2 wherein the means for controlling the drive motors on the intermediate towers and the end tower includes contacts connected in said conductors and wherein said system includes a second plurality of lamps, each lamp of said second plurality being connected between a pair of said conductors on a side of said contacts opposite to that side on which said first plurality of lamps is connected.

4. A monitoring system as set forth in claim 3 wherein the means for controlling the drive motors on the intermediate towers and the end tower includes a contactor coil to provide forward movement of the apparatus, a contactor coil to provide for reverse movement of the apparatus and said system includes a lamp connected to said first-mentioned contactor coil to be energized when said first-mentioned contactor coil is energized and a lamp connected to said second-mentioned contactor coil to be energized when said second-mentioned contactor coil is energized.

5. A monitoring system as set forth in claim 4 wherein the mobile irrigation apparatus includes means for supplying controlling electrical power to all said controlling means and said system includes a lamp connected to the controlling electrical power supply means for indicating that controlling electrical power is being supplied.

6. A monitoring system as set forth in claim 5 wherein the mobile irrigation apparatus includes a conductor extending along the length thereof from one tower to another, means for supplying current to said conductor when said apparatus is in operation and means responsive to current flow in the conductor to interrupt the operation of the apparatus in the event of misalignment thereof and wherein said system includes a first lamp connected to said operation interrupting means so as to be energized when the apparatus is aligned and a second lamp connected to said operation interruting means so as to be deenergized when the apparatus is misaligned.

7. A monitoring system as set forth in claim 6 wherein said mobile irrigation apparatus includes a timer for controlling the movement of the end tower and wherein said system includes a lamp connected to said timer so as to be periodically energized thereby to provide an indication that the timer is operating.

8. A monitoring system as set forth in claim 7 including a lamp connected to said means for supplying controlling power to all said controlling means, a relay including contacts connected to said lamp, said relay being connected to said means for supplying controlling power to all said controlling means, a switch including contacts connected to said relay and effective upon operation to energize said relay, said relay contacts upon energization of said relay interrupting a circuit to said lamp and uon de energization completing a circuit to said lamp.

* * * * *